Jan. 30, 1940.  A. F. WILLIAMS  2,188,585
OPTICAL LENS GROOVER
Filed Jan. 27, 1936  2 Sheets-Sheet 1
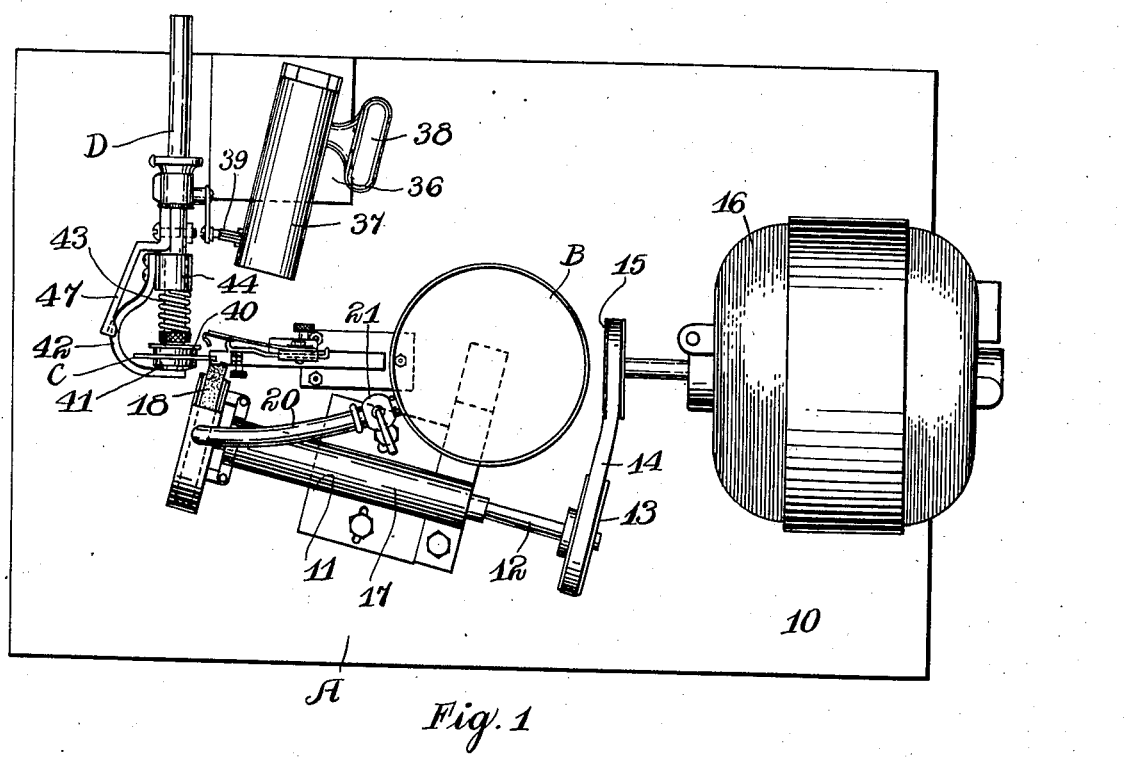
Fig. 1
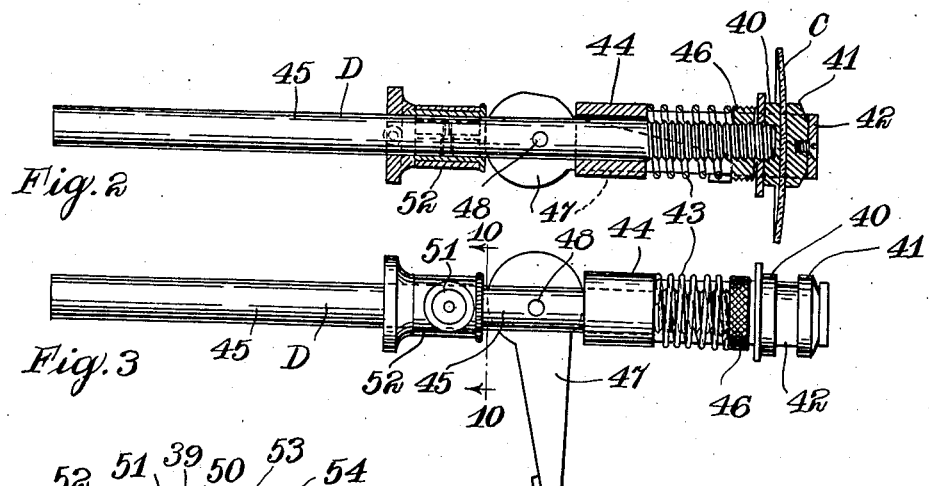
Fig. 2
Fig. 3
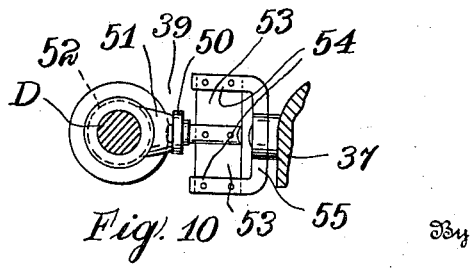
Fig. 10
Inventor
Arthur F. Williams
By Thomas J. Fischer
Attorney Jan. 30, 1940.                A. F. WILLIAMS                2,188,585
                            OPTICAL LENS GROOVER
                            Filed Jan. 27, 1936          2 Sheets-Sheet 2

Inventor
Arthur F. Williams
By Howard L. Pincha
Attorney

Patented Jan. 30, 1940

2,188,585

UNITED STATES PATENT OFFICE 2,188,585

OPTICAL LENS GROOVER

Arthur F. Williams, St. Paul, Minn., assignor to Wils-Edge Corporation, St. Paul, Minn., a corporation of Minnesota Application January 27, 1936, Serial No. 60,960

17 Claims. (Cl. 51—278)

This invention is for a machine adapted to groove eyeglass and spectacle lenses to provide a groove in arcuated or curved lenses along the edge of the lens, the groove being adapted to provide shoulder means for securing the lens to the groove in a frame which is designed to support the lens. This optical lens groover is provided with a supporting means which is adapted to grip the lens and firmly hold the same while the lens is moved through two arcs.

A feature resides in providing a lens groover which will cut a groove along the edge of a curved lens, the holding means for the lens being adapted to hold the lens so that it can be moved in the path of a cutting means or wheel which will grind a groove of equal depth into the edge of the lens as the lens is passed through a plate intersecting the path of the grinding means. In forming the groove into the edge of a curved lens, the holding means of my machine is designed so that in a single movement of the lens supporting means, a groove may be cut in the edge of a curved lens, following the curve of the body of the lens and at the same time following the curve or arc of the edge of the lens, thus passing through a double arc in a single operation to form a groove of equal depth extending along an arcuated edge of the lens.

My lens groover is provided with an adjustable gauge means for regulating the depth of the cut in the edge of the lens so that a groove may be formed marginally on each side of the lens. Thus a dove-tailed or wedge-shaped cross-sectional edge may be formed along the margin of a curved lens so that the lens may be fastened into a spectacle frame which is adapted to support the lens along a single edge thereof rather than encircling the lens. This optical lens groover is designed to cut the desired groove in the marginal edge of the lens so that the frame for supporting the lens may extend along in a complemental curve with the eyebrow of the face from the bridge portion, like I have illustrated in my patent application, Serial No. 728,263, which has become Patent No. 2,069,347, dated February 2, 1937.

The details and features of my optical lens groover are fully disclosed in the drawings.

Figure 1 illustrates a plan view of my optical lens groover.

Figure 2 is a detail of the lens supporting arm, partially illustrated in cross-section.

Figure 3 is a side view of the lens supporting arm.

Figure 10 is a section on the line 10—10 of Figure 3.

Figure 4:
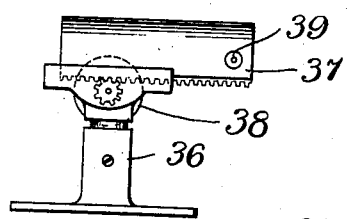
Figure 4 is a detail of a portion of the adjustable standard for holding the lens supporting arm.
Figure 5:
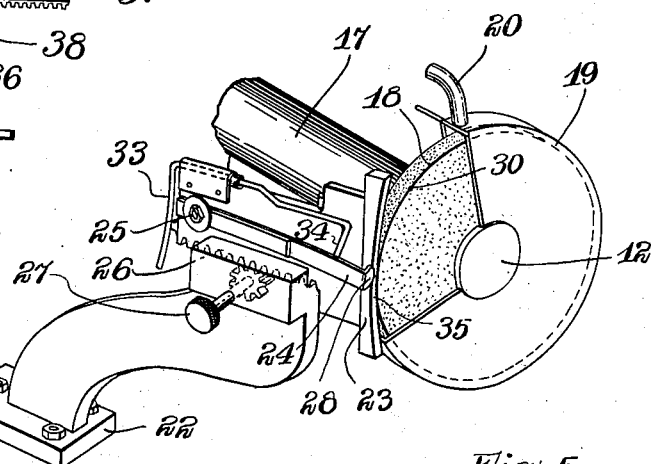
Figure 5 is a perspective view, showing the cutting wheel in relation to the standard for adjustably supporting the gauge means of my groover.

My optical lens groover A is provided with a base portion 10 upon which is adjustably mounted a standard 11 which provides a support for the drive shaft 12. The drive shaft 12 is adapted to be operated by the pulley 13, the flexible belt 14, and the pulley 15, which is driven by the electric motor 16 which is mounted upon the base 10.

The shaft 12 extends through the bearing 17 carried on the upper end of the standard 11 and supports the grinding wheel 18 on the end opposite the pulley 13. The wheel 18 is provided with a guard 19 and water is directed from the container B through the tube 20 to the grinding wheel 18. A valve 21 controls the flow of liquid or water from the tank B to the wheel 18.

Figure 6:
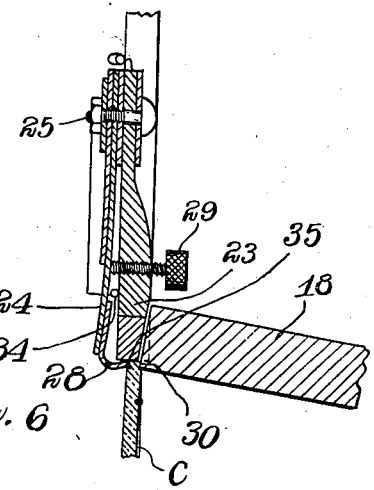
Figure 6 is an enlarged sectional detail.
Figure 7:
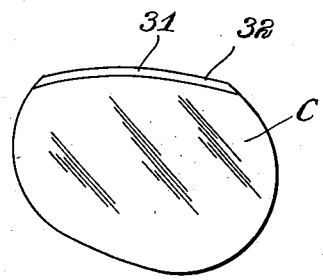
Figure 7 illustrates a curved lens with a groove formed marginally thereof.
Figures 8, 9:
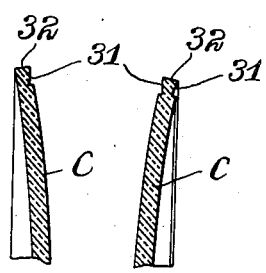
Figure 8 illustrates an enlarged sectional detail of a lens with a marginal groove cut on one side.
Figure 9 is an enlarged sectional detail of a lens with the marginal grooves cut on both sides of the same.

A standard 22 is also mounted upon the base 10 and is adapted to adjustably support the gauge plate 23 which is held by the standard 22 adjustable in relation to the grinding wheel 18. A spring gauge 24 is secured by the bolt 25 to the adjustable rack 26 which is adjusted by the screw 27 to regulate the position of the gauge 23 and the gauge end 28 in relation to the grinding wheel 18. An adjusting screw 29 positions the gauge end 28 from the grinding wheel 18, as illustrated in Figure 6, while the adjusting screw 27 carries the rack bar 26 to adjust the gauge plate 23 and the spring gauge arm 24 as a unit toward or away from the grinding edge 30 of the wheel 18. The lens C is shown in Figure 7 and a detail portion of the same is shown in section in Figures 6, 8 and 9. My optical lens groover is adapted to cut grooves 31 in the marginal edge of the lens C, a groove 31 being first cut on one side of the lens, and then a second groove being cut on the opposite side of the lens to provide a marginal grooved portion extending along the top arcuated edge 32 of the lens C.

A lever 33 is mounted on top of the gauge plate 23 and the rack bar 26 and is provided with an operating end 34 which engages near the free end of the spring gauge arm 24 so as to release the arm 24 away from the grinding wheel to permit the lens C to be formed with a first groove 31 on one side, while the arcuated edge 32 of the lens bears against the end 35 of the gauge bar 23. Then the lever 33 is released and the gauge end 28 of the arm 24 may engage in the groove 31 formed in the lens C to assist in holding the lens C in proper position while a second groove 31 is formed on the other side of the lens. The cross-sectional shape of the edge of the lens after it is formed with the grooves 31 on each side is approximately dove-tailed.

In grinding the marginal grooves 31 in the lens C, I provide a lens supporting arm D which is supported by the adjustable standard 36 which is mounted upon the base 10 and which is provided with an adjustable rack member 37 which is adjusted by the screw 38. The arm D is universally mounted by the connection 39 to the rack 37.

The arm D includes a pair of rubber gripping discs 40 and 41 between which the curved lens C is adapted to be gripped. The disc 41 is carried by the yoke arm 42, shown in Figure 1, while the disc 40 is adjustably positioned on the end of the arm D adjacent the disc 41. The yoke 42 is mounted upon the collar 44 which is slidably supported upon the shaft 45 of the arm D and a coil spring 43 is mounted on the shaft 45 between the adjustable collar 46 and the slidable collar 44.

A cam lever 47 is pivoted at 48 to the shaft 45 and when the lever 47 is in the position illustrated in Figure 2, the collar 44 is moved by the spring 43 to cause the yoke arm 42 to draw the disc 41 toward the disc 40 to grip the lens C between the discs 40 and 41 under the spring tension of the coil spring 43. When the lever 47 is released from the position illustrated in Figure 2, to the position illustrated in Figure 3, the yoke arm 42 moves the gripping disc 41 away from the lens C to release the same.

In operation the motor 16 drives the shaft 12 to operate the grinding wheel 18. The lens supporting arm D grips the lens C, holding the same firmly between the grippers 40 and 41, and the operator moves the arm assembly W with the arcuated upper edge 32 of the lens C resting against the gauge surface 35 of the gauge 23, and by manipulating the arm D on the universal joint 39, the lens C may be moved to cause the grinder wheel 18 to cut a groove 31 marginally in the edge of the curved lens C. In this operation, it will be observed that the groove 31 is evenly cut marginally of the arcuated edge 32 following the arcuated edge 32 to cut a true marginal arcuated groove 31 conforming with the arc of the edge 32, at the same time the groove 31 is formed to follow the curved surface of the curved lens C. After one groove 31 has been cut in one side of the lens C, the lens may be reversed and a similar groove cut in the opposite edge of the same, thereby cutting the marginal grooves 31 which follow the contour of the curved surfaces and edge of the lens C.

The universal connection 39 comprises an arm 50 securely held from turning with respect to the boss 51 on the collar 52 freely rotatable on the arm D. The arm 50 is pivoted to the split shaft having a resilient spring 53 riveted therein. This spring 53 is secured to oppositely disposed arms 54 of the yoke 55, which is secured to the rack 37. While providing a universal movement, this type of connector 39 tends to hold the arm D in normal position at all times.

My lens groover A is designed to cut the proper marginal groove in a lens such as C, so that the lens may be readily mounted in the mounting or frame portion, such as is illustrated in my patent application, Serial No. 728,263, which has become Patent No. 2,069,347, dated February 2, 1937. By this optical lens groover, I am able to form the proper shaped marginal groove so that the lenses may be mounted in the frames which are formed with a similar groove adapted to extend in arced formation to fit the marginal grooves 31. Thus by means of suitable cement in the grooves 31, or by any other means suitable for the purpose, the lens C may be mounted without the drilling of holes or without a surrounding frame so that the lens C will be held firmly locked in the frame which is adapted to carry the same. This provides a mounting for a lens where a clearer vision is afforded owing to the fact that there are no holes in the lens adjacent the nose, and because the frame extends along the top of the lens adjacent the eyebrow so as not to obstruct in any manner whatsoever the vision of the eye.

I claim:

1. The method of forming a supporting groove for an optical lens having opposed faces and an arcuated edge connecting said faces, the groove being spaced from an arcuated edge of the lens marginally consisting in gripping the lens to hold the same firmly, and moving a face of the lens in the path of a cutting element to form a true marginal groove in a face and along the marginal edge of the lens of a predetermined depth.

2. A lens groover comprising a base, a grinding wheel on said base having peripheral and radial grinding surfaces providing a corner, a work clamp swingably supported on said base, and a guide mounted on said base spaced from said corner of said grinding wheel engageable with the edge of the work supported by said clamp whereby said corner may grind said work at a point spaced from the edge engaging said guide.

3. A groover for toric lenses comprising a base, a grinding wheel thereon, a clamping means engageable with the opposite lens surfaces, means pivotally supporting said clamping means at approximately the center point of the tore, and guide means exposing a portion of the lens edge engageable with the lens edge to hold the edge in proper relation to the grinding wheel.

4. A groover for concave lenses comprising a base, a grinding wheel thereon, a clamping means supporting the concave lens, means pivotally mounting said clamping means at approximately the center of concavity of the lens, and said mounting means constructed to permit oscillation of said lens substantially about the center of curvature of the lens edge.

5. A groover for concave lenses having an arcuate edge comprising a base, a clamping means for said lens, means pivoting said clamping means at substantially the center of concavity of the lens, said clamping means constructed to permit oscillation of said clamping means about the center of curvature of a portion of the lens edge, and grinding wheel means on said base for grinding a groove on said supported lens.

6. A groover for concave lenses comprising a work support, means pivotally mounting said work support at substantially the center of concavity of the lens supported thereby, said last named means constructed to permit oscillation of the work support substantially about the center of curvature of a portion of the lens edge, guide means engageable with the lens edge, and grinding means for grinding a groove in the supported lens.

7. A groover for grooving an arcuate edge of a concave lens comprising means supporting the concave lens, means pivotally mounting said lens at substantially the center of concavity of said lens, said last named means constructed to permit oscillation of said lens substantially about the center of curvature of a portion of the lens edge, and a grinding means, said mounting means holding the surface of the lens in proper relation to said grinding wheel regardless of the rotative position of said lens.

8. A groover for concave lenses comprising a base, a grinding wheel supported thereon, a guide spaced from the edge of said grinding wheel adapted to engage a lens edge, and spring means on said guide engageable on one surface of a lens for urging said lens under spring tension against said grinding wheel until a groove of proper depth is formed.

9. A lens groover in combination with a lens to be grooved, the lens having opposed faces and a connecting edge, the groover comprising a grinding element, a swingable means supporting the lens to be grooved to contact said grinding element along a line on a lens face spaced from the edge of the lens, and guide means exposing a portion of the lens face and edge adjacent said grinding element engageable with the lens edge and guiding the supported lens to space the groove from the lens edge.

10. A lens groover for grooving a lens including a grinding element, an adjustable gauge means slidably engaging the edge of the lens, and means for engaging and supporting the lens and exposing a portion of the lens edge and the lens surfaces adjacent said edge, means pivotally mounting said supporting means for swinging movement about the center of curvature of the face of the lens when supported, said means constructed to permit oscillation of said lens substantially about an axis the center of curvature of a portion of the lens periphery.

11. A grinding device for a lens having opposed surfaces, and an edge bounding said surfaces, said device comprising a grinding element, a guide supported adjacent said grinding element engageable with said lens edge, spring urged means engaging one surface of said lens urging the opposite surface of said lens against said grinding element, and means limiting the inward movement of said spring urged means.

12. A grinding device for a lens having opposed surfaces, and an edge bounding said surfaces, said device comprising a grinding element, having a grinding edge, a guide spaced from said grinding edge, spring urged means engaging one surface of the lens urging the opposite surface of said lens against said grinding edge at a point spaced from the lens edge, and means limiting the movement of said spring urged means.

13. A lens groover for a lens having opposed surfaces and an edge bounding said surfaces, said groover comprising a lens support exposing a portion of said lens edge and the surfaces adjacent said portion, and a guide means engageable with the lens edge, and a grinding element spaced from said guide means and engageable with a lens surface, whereby said lens may be supported for grinding a groove in a surface adjacent and connecting the edge engaged by said guide.

14. A lens groover for a lens having opposed curved surfaces and an arcuated edge bounding said surfaces, said groover including a means supporting said lens to expose a portion of said edge and the lens surfaces adjacent said portion, means pivotally mounting said lens supporting means, means rotatably supporting said lens supporting means, and lens grinding means engageable with a surface of said pivotally and rotatably supported lens, whereby said lens may be supported for grinding a groove in said exposed portion of the lens surface, the groove being arcuated to follow said arcuated lens edge in one of said curved surfaces.

15. A lens groover for a lens having opposed surfaces and an edge connecting these surfaces, at least a portion of which is curved; said groover including a grinding element, a swingable lens supporting clamp for supporting the lens to be grooved in a manner to cause said grinding element to engage one of the said surfaces of said lens, and means engageable with the said curved edge of said lens, said means spaced from said grinding element, whereby said lens may be maintained in engagement with said grinding element at a predetermined distance from the said curved portion of the lens edge.

16. A lens groover for a lens having opposed surfaces and a connecting edge peripherally about these surfaces, at least a portion of which is curved; said groover comprising a base, a grinding wheel mounted on said base, adjoining radial and peripheral grinding surfaces on said wheel, a lens clamping means swingably mounted on said base supporting a lens substantially tangent to said grinding wheel, a guide means engageable with the said curved edge portion and spaced from the junction of said wheel grinding surfaces to maintain a predetermined distance between the said lens edge and said junction of said grinding surfaces of said wheel, whereby a groove may be formed in one of said lens surfaces at a predetermined distance from said lens edge.

17. The method of grooving spectacle lenses consisting in firmly supporting the lens swingable through a compound curve and cutting a groove substantially parallel to the peripheral edge of the lens as it is swung through the radii of the curves.

ARTHUR F. WILLIAMS.